T. J. MURPHY.
ELECTRICITY RECTIFIER.
APPLICATION FILED MAR. 19, 1908.
914,499.  Patented Mar. 9, 1909.
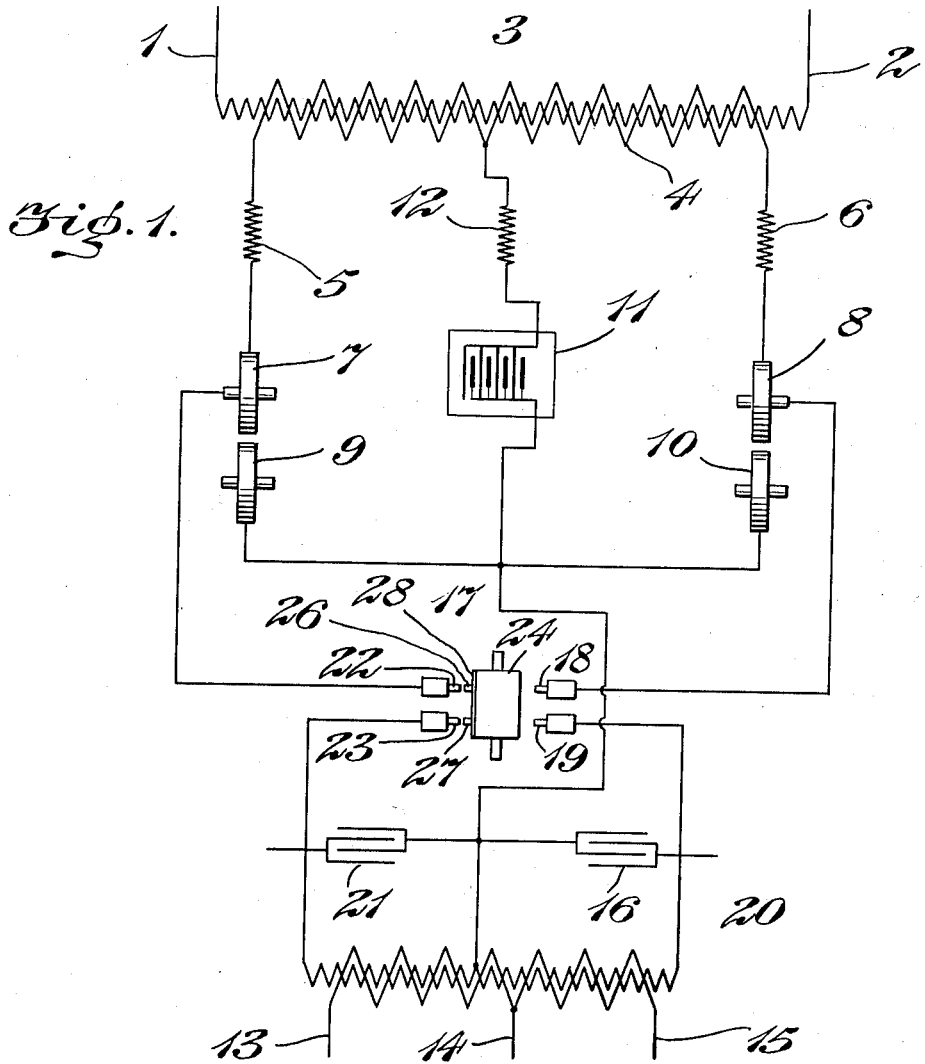
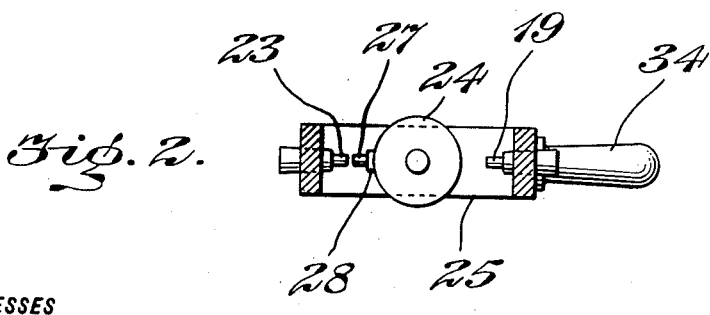
WITNESSES
H. C. Abbott
V. N. Fell
INVENTOR
Thomas J. Murphy
BY Faust F. Crampton
ATTORNEYS

UNITED STATES PATENT OFFICE.

THOMAS J. MURPHY, OF ROCHESTER, NEW YORK.

ELECTRICITY-RECTIFIER.

No. 914,499.   Specification of Letters Patent.   Patented March 9, 1909.

Application filed March 19, 1908. Serial No. 422,012.

*To all whom it may concern:*

Be it known that I, THOMAS J. MURPHY, electrical engineer, a subject of the King of Great Britain, residing in Rochester, county of Monroe, State of New York, have invented new and useful Improvements in Electricity-Rectifiers, of which the following is a specification.

My invention relates to a means for rectifying an alternating current with the greatest possible efficiency.

It has for its object to change an alternating current so that the same may be used for all the purposes for which a rectified current may be used such as for charging a battery.

In the embodiment of my invention a device is connected in a circuit having a source of pulsating current which subjects the current to an exceedingly high resistance which may be suddenly broken down when the pulsating potential becomes such as to be able to maintain a current through the device as well as through the balance of the circuit. In the case of alternating current the device is rendered passable to the electric current at desired points in the potential changes and while it is sufficiently high to maintain the flow of the current through the resistance of the circuit and against any counter electro motive forces it may meet.

The invention is based upon my discovery that an electric arc will not maintain itself for an appreciable length of time after the source of the electro-motive force is withdrawn or decreases below a certain amount if the electrodes across which the arc has been established are of such a character that the arcing temperature may be immediately reduced upon withdrawal of the electro-motive force producing the arc. During the time of the arcing the resistance of the circuit is greatly reduced and a current having a comparatively low electro-motive force will pass through the arc.

The invention consists in providing a means for causing an alternating current to cross a gap normally impassable to the said current at a definite point in its potential wave.

The invention also consists in providing a pair of revoluble disks which are connected with a source having a high electro-motive force and which are also connected in a circuit having the source of current which it is desired to rectify.

The invention also consists in providing condensers which are in series with the said electrodes and shunts the source of the current having the said high electro-motive force.

The invention also consists in providing an adjustable spark gap for discharging a condenser at definite periods of time across electrodes located in the circuit of a source of current of relative low electro-motive force and high amperage.

The invention consists in other features set forth in the following description shown in the drawings and claimed in the claims.

Referring to the drawings, Figure 1 illustrates diagrammatically the connections of my invention. Fig. 2 illustrates one of the details partly in section.

1, 2 are leads which are connected to a source of alternating current. The leads are connected to the transformer 3. The outside terminals of the secondary 4 of the transformer are connected to balancing reactances 5 and 6. The reactances 5 and 6 are connected to the movable electrodes 7 and 8. The movable electrodes 7 and 8 are preferably in the form of a disk and are made to rotate continuously during the operation of the apparatus. Similar disks 9 and 10 are connected together and complete the circuit on the other side. A battery 11 which is to be charged is connected to the center of the secondary 4 through the air core reactance coil 12. The coil 12 prevents disruptive discharge sparks from endangering the transformer and other connected instruments.

13, 14 and 15 are leads connected to a source of current. A transformer 20 is connected to the said leads in such a way as to increase the electro-motive force of the current and reduce the quantity of the current. A condenser 16 is connected across the terminals of one side of the secondary of the transformer 20. The terminals of one side of the secondary of the transformer 20 are connected to the disks 8 and 10 through a disruptive discharge gap located in a synchronizer. The synchronizer 17 is connected in series with the said electrodes, it being provided with insulated terminals 18 and 19 and connected terminals 26 and 27. When a spark takes place between the terminals 18 and 19 and 26 and 27 the circuit of one side of the transformer 20 is completed. The connections of the other side of the transformer are the same, that is, the condenser 21 is connected across the terminals of the other half of the transformer and the electrodes 7 and 9 are connected in series and the circuit is completed through the contacts 22 and 23.

The synchronizing circuit closer 17 consists of a rotating cylinder 24 which is mounted in a frame 25. The cylinder 24 rotates synchronously with the frequency of the alternating current of the transformer 3. The cylinder is provided with a pair of terminals 26 and 27 which are connected to a bar 28. The cylinder 24 is of insulating material. The terminals located on the cylinder 24 are adapted not to rub against the adjustable terminals. The terminals are mounted in the frame 25. The frame 25 is provided with a handle 34. This provides a means for turning the frame 25 to any position so that the terminals of the synchronizing cylinder will come into the proximity of the terminals of the frame 25 at any desired point in the curve of the current wave of the source 3 and the circuit may thus be completed when the electro-motive force is zero or it may be completed when the electro-motive force reaches its highest point or when the electro-motive force is rapidly decreasing in amount.

In the operation of the system the disruptive discharge of the condenser 16 across the terminals of the synchronizer causes an arc to be formed between the electrodes 8 and 10. The arc once established reduces the resistance of the alternating circuit having a lower potential and the current immediately begins to flow. It then maintains the arc until the electro-motive force equals the counter electro-motive force. The arc would continue some little time after the electro-motive force has decreased below that which maintained the arc but inasmuch as the electrodes 8 and 10 are kept moving the temperature of the arc decreases and it very quickly discontinues the moment the electromotive force of battery equals the impressed electro-motive force. During the time that the arc is passing between the electrodes 8 and 10 a current is flowing across the electrodes 8 and 10 by reason of the bridging of the gap and through the battery 11, the sudden changes of the current being modified and flattened by the reactance coils 5 and 6. The rocker frame 25 being adjustable with respect to the synchronizing cylinder 24 the current may be allowed to start at any particular point on the alternating current wave since the arcing between the electrodes 8 and 10 reduces the resistance at such points.

The invention may be modified by those skilled in the art without departing from the spirit of my invention, and the description above given merely describes and the drawing merely illustrates one embodiment of my invention.

What I claim as new and desire to secure by Letters Patent is as follows:

1. In a rectifier the combination of a double main circuit and a double auxiliary circuit, each of said circuits having a source of electric energy, means for forming a momentary arc first on one side of the said circuits and then on the other.

2. In a rectifier the combination of a main circuit and a subsidiary circuit, a pair of electrodes located in the main circuit, a synchronous circuit closer located in the subsidiary circuit for causing the said circuit to complete the said main circuit across said electrodes.

3. In a rectifier the combination of a source of alternating current connected in a circuit having a gap normally impassable to the said current and means for causing the said current to flow across said gap at definite points in its wave.

4. In a rectifier the combination of a source of alternating current connected in a circuit having a gap normally impassable to the said current and means for causing a current to pass across the said gap until the potential of the said current falls below a definite amount.

5. In a rectifier the combination of a source of alternating current connected in the circuit having a gap normally impassable to the said current and means for causing the current to begin to flow at a definite point in the potential wave of the current and to continue to flow until the potential wave falls below a definite amount.

6. In a rectifier the combination of a source of variable current located in a circuit having a gap normally impassable to the said current, means for causing the current to begin to flow when the potential of the current reaches a fixed amount and allowing it to continue to flow until it again becomes substantially the same amount.

7. In a rectifier the combination of a source of variable current located in a circuit having a gap normally impassable to said current, a second source of current having relatively high potential and means for causing the said second current to permit the said first current to flow while the potential of the said first current is above a definite amount.

8. In a rectifier the combination of a source of alternating current located in a circuit having a gap normally impassable to the said current, a source of current having high electro motive force, a spark gap adapted to control the flow of the second named current across the first named gap and adjustable with reference to the first named current wave.

9. In a rectifier the combination of a source of alternating current located in a circuit having a gap normally impassable to the said current, a source of current having a relatively high electro motive force, a spark gap adapted to control the flow of the said currents across the said first named gap at definite periods of the wave of the first named current.

10. In a rectifier the combination of a source of alternating current, two pairs of rotating electrodes connected to the said source, a return wire also connected to the said electrodes, means for causing a disruptive discharge across each pair of electrodes alternately according to the direction of flow of the current in the said circuit.

11. In a rectifier the combination of a main circuit, movable electrodes connected to the said circuit, a subsidiary circuit connected to the said movable electrodes a synchronous circuit closing device in said subsidiary circuit whereby the flow of the current of the first named circuit is controlled.

12. In a rectifier the combination of a main circuit, two pairs of rotating electrodes, and a battery connected in the said circuit, a subsidiary circuit connected to the said electrodes, a synchronous circuit closer adapted to alternately complete the subsidiary circuit across the said pairs of electrodes.

13. In a rectifier the combination of a main circuit, two pairs of rotating electrodes, a subsidiary circuit connected to said electrodes, a synchronous circuit closer adapted to complete the subsidiary circuit through the pairs of electrodes alternately and means for adjusting the said synchronous circuit closer with respect to the fluctuations of the current of the said main circuit.

14. In a rectifier the combination of a source of alternating current, electrodes connected to the said circuit, a synchronous circuit closer connected to the said electrodes, a source of subsidiary current also connected to the said electrodes through the said circuit closer, a condenser connected in parallel to the said circuit closer and the said electrodes.

15. In a rectifier the combination of a source of alternating current, two pairs of rotating electrodes and a return wire connected to the said source of alternating current, a subsidiary source of current having a relatively high electro-motive force, a spark gap connected to the subsidiary source and adapted to permit an arc to be started across the said electrodes alternately at definite points in the current wave of the first named source and condensers connected in shunt with the said subsidiary source of current and in parallel with the said electrodes and the said spark gap.

16. In a rectifier the combination of a source of alternating current, movable electrodes, a source of current having relatively high electro motive force, means for causing the second named current to form an arc across the said electrodes which is maintained by the first named current.

17. In a rectifier the combination of a source of alternating current, movable electrodes, a source of current having a relatively high electro motive force, means for causing the second named current to form an arc at definite periods in the potential wave of the first named current until the wave falls below a definite point.

18. In a rectifier the combination of a source of variable current located in a circuit having a gap normally impassable to the said current, means operating in unison with the variations of the said current for causing the said current to form an arc across the said gap when the said current reaches a potential sufficient to maintain the said arc.

In testimony whereof, I have signed my name to this specification, in the presence of two subscribing witnesses.

THOMAS J. MURPHY.

Witnesses:
R. T. LORD,
F. A. MURTAGH.